US009226316B2

United States Patent
Cordeiro et al.

(10) Patent No.: US 9,226,316 B2
(45) Date of Patent: *Dec. 29, 2015

(54) DEVICE, SYSTEM AND METHOD OF COMMUNICATING DURING AN ASSOCIATION BEAMFORMING TRAINING (A-BFT) PERIOD

(71) Applicant: INTEL CORPORATION, Santa Clara, CA (US)

(72) Inventors: Carlos Cordeiro, Portland, OR (US); Elad Levy, Rishon LeZion (IL); Solomon B. Trainin, Haifa (IL); Michael Glik, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,362

(22) Filed: Jan. 29, 2015

(65) Prior Publication Data

US 2015/0139163 A1 May 21, 2015

Related U.S. Application Data

(63) Continuation of application No. 13/668,492, filed on Nov. 5, 2012, now Pat. No. 8,989,163.

(60) Provisional application No. 61/656,375, filed on Jun. 6, 2012.

(51) Int. Cl.
*H04W 4/00* (2009.01)
*H04W 74/04* (2009.01)
*H04B 7/06* (2006.01)

(52) U.S. Cl.
CPC ............. *H04W 74/04* (2013.01); *H04B 7/0617* (2013.01)

(58) Field of Classification Search
None
See application file for complete search history.

(56) References Cited

U.S. PATENT DOCUMENTS

| 8,989,163 | B2 | 3/2015 | Cordeiro et al. | |
| 2010/0054223 | A1 | 3/2010 | Zhang et al. | |
| 2010/0103045 | A1 | 4/2010 | Liu et al. | |
| 2010/0105409 | A1* | 4/2010 | Agarwal et al. | 455/456.1 |
| 2010/0265925 | A1 | 10/2010 | Liu et al. | |
| 2011/0064033 | A1* | 3/2011 | Gong et al. | 370/329 |
| 2012/0009880 | A1 | 1/2012 | Trainin et al. | |

(Continued)

FOREIGN PATENT DOCUMENTS

KR 2012-0005461 1/2012

OTHER PUBLICATIONS

Wireless Gigabit Alliance (WGA) Specifications; WiGig MAC and PHY Specification Version 1.0, Apr. 2010—Final Specification; 311 pages.

(Continued)

*Primary Examiner* — Kouroush Mohebbi
(74) *Attorney, Agent, or Firm* — Shichrur & Co.

(57) ABSTRACT

Some demonstrative embodiments include devices, systems and/or methods of communicating during an Association-Beamforming-Training (A-BFT). For example, a device may include a wireless communication unit to communicate a beacon frame during a beacon transmission interval (BTI), the beacon frame including a responder address field including a responder address representing one or more client devices, which are allowed to transmit during an A-BFT period following the BTI.

24 Claims, 5 Drawing Sheets

(56) References Cited

U.S. PATENT DOCUMENTS

2013/0003662 A1  1/2013  Lee et al.
2013/0044695 A1  2/2013  Xu et al.

OTHER PUBLICATIONS

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications, Jun. 12, 2007, 1232 pages.

Wi-Fi Alliance Technical Committee P2P Task Group; Wi-Fi Peer-to-Peer (P2P) Technical Specification; Version 1.2; Dec. 14, 2011; 160 pages.

International Search Report and Written Opinion for International Patent Application No. PCT/US2013/041408, mailed on Aug. 27, 2013, 13 pages.

International Preliminary Report on Patentability for International Patent Application No. PCT/US2013/041408, mailed on Dec. 18, 2014, 9 pages.

Office Action for U.S. Appl. No. 13/668,492, mailed on Jul. 16, 2014, 23 pages.

Office Action for Korean Patent Application No. 2014-7031463, mailed on Jun. 5, 2015, 12 pages, including 6 pages of English translation.

* cited by examiner

DEVICE, SYSTEM AND METHOD OF COMMUNICATING DURING AN ASSOCIATION BEAMFORMING TRAINING (A-BFT) PERIOD

CROSS REFERENCE

This Application is a Continuation Application of U.S. patent application Ser. No. 13/668,492, filed Nov. 5, 2012, which claims the benefit of and priority from U.S. Provisional Patent application No. 61/656,375, entitled "Filtering responses to beacon frames in directional wireless systems", filed Jun. 6, 2012, the entire disclosures of which are incorporated herein by reference.

BACKGROUND

In some wireless communication networks, communication may be performed during beacon intervals (BI), which may be scheduled, for example, according to a beacon and/or an announce frame.

The beacon may be transmitted during a beacon transmission interval (BTI), which may be followed by an Association Beamforming Training (A-BFT) period.

During the A-BFT client devices perform a beamforming procedure with a central coordinator.

A client device that receives the beacon frame from the central coordinator during the BTI is allowed to access and transmit during the following A-BFT in order to perform the beamforming with the central coordinator.

The beamforming may allow the central coordinator and the client device to establish a directional and high throughput wireless communication link between the central coordinator and the client device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2102; IEEE802.11 task group ac (TGac) ("*IEEE*802.11-09/0308r12—*TGac Channel Model Addendum Document*"); *IEEE* 802.11 *task group ad* (*TGad*) (*IEEE* P802.11*ad/D*9.0 *Draft Standard for Information Technology—Telecommunications and Information Exchange*

Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WiFi Alliance (WFA) Peer-to-Peer (P2P) specifications (WiFi P2P technical specification, version 1.3, 2012) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "personal basic service set" (PBSS), as used herein, may relate to a basic service set (BSS) that forms a self-contained network. For example, the PBSS may operate in the DMG band, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner", as used herein, may relate to an "AP-like" entity, when referring to non-DMG networks, or to a PCP, when referring to DMG networks that may provide and use connectivity between clients.

The phrase "P2P Group", as used herein, may relate to a set of devices including one P2P Group Owner and zero or more P2P Clients.

The phrase "Beacon interval", as used herein, may relate to a number of time units (TUs) between target beacon transmission times (TBTTs).

The phrase "beacon transmission interval" (BTI), as used herein, may relate to a time interval between the start of a first beacon transmission by a STA in a beacon interval to an end of a last beacon transmission by the STA in the same beacon interval.

The phrase "association beamforming training" (A-BFT), as used herein, may relate to a time allocated for a STA, following the BTI, to respond to beacons transmitted during the BTI, e.g., using a sector sweep.

The phrase "announcement transmission interval" (ATI), as used herein, may relate to a request-response based management access period between PCP/AP and non-PCP/non-AP STAs. The presence of the ATI may be optional and signaled in DMG Beacon frames.

The phrase "data transfer interval" (DTI), as used herein, may relate to an access period during which frame exchanges are performed between STAs. For example, there may be a single DTI per beacon interval.

Figure 1:
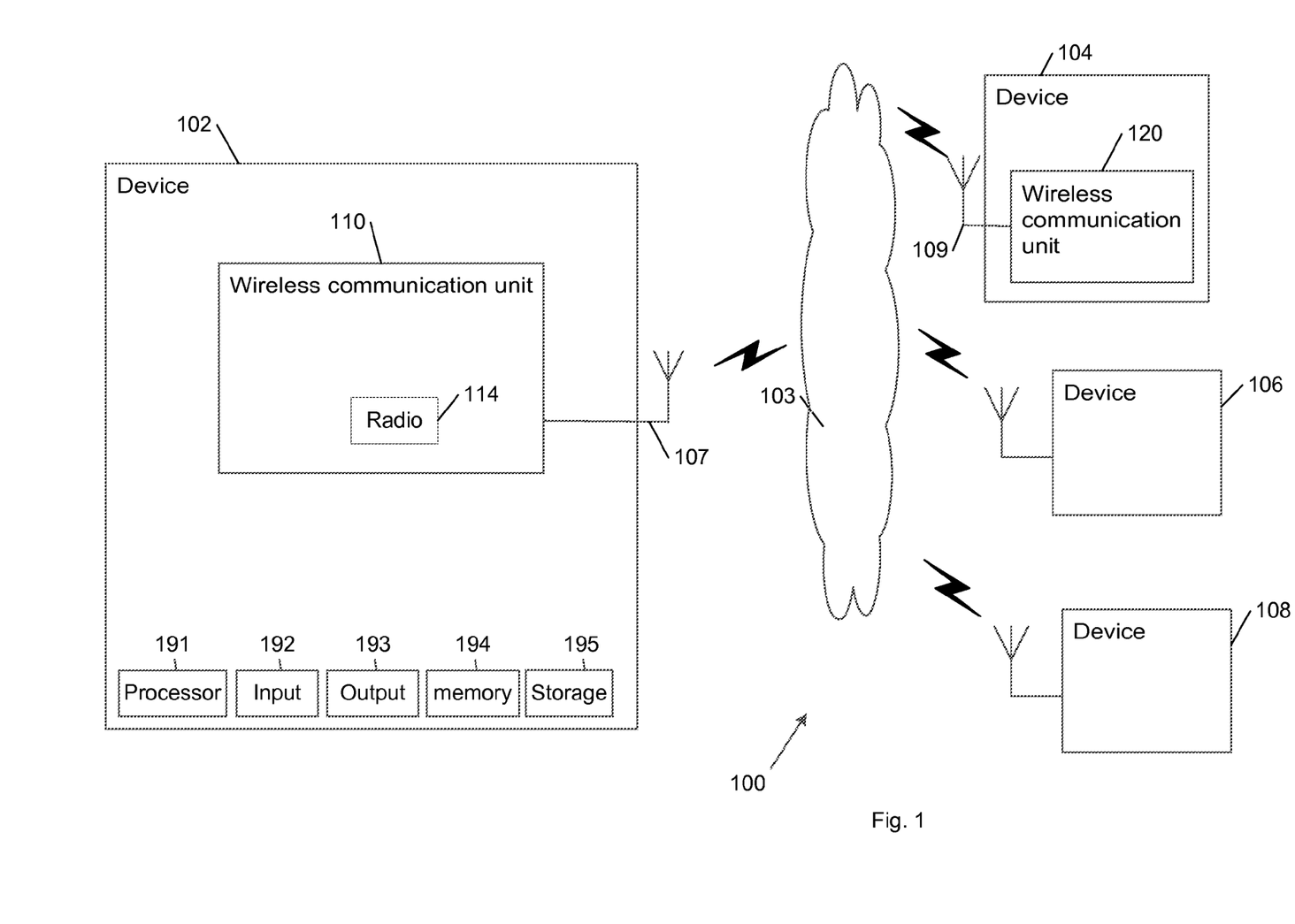
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 104, 106 and/or 108, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 104 106 and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 104, 106 and/or 108 may include wireless communication units, to perform wireless communication between wireless communication devices 102, 104, 106 and/or 108 and with one or more other wireless communication devices. For example, device 102 may include a wireless communication unit 110 and device 104 may include a wireless communication unit 120, e.g., as described below.

Wireless communication devices 102, 104, 106 and/or 108 may also include, for example, one or more of a processor 191, an input unit 192, an output unit 193, a memory unit 194, and a storage unit 195. Wireless communication devices 102, 104, 106 and/or 108 may optionally include other suitable hardware components and/or software components. In some demonstrative embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102, 104, 106 and/or 108 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102, 104, 106 and/or 108.

In some demonstrative embodiments, wireless communication units 110 and 120 may include, or may be associated with, one or more antennas 107 and 109, respectively. Antennas 107 and 109 may include any type of antennas suitable for transmitting and/or receiving wireless communication signals, blocks, frames, transmission streams, packets, messages and/or data. For example, antennas 107 and 109 may include any suitable configuration, structure and/or arrangement of one or more antenna elements, components, units, assemblies and/or arrays. Antennas 107 and 109 may include, for example, antennas suitable for directional communication, e.g., using beamforming techniques. For example, antennas 107 and 109 may include a phased array antenna, a single element antenna, a set of switched beam antennas, and/or the like. In some embodiments, antennas 107 and 109 may implement transmit and receive functionalities using separate transmit and receive antenna elements. In some embodiments, antennas 107 and 109 may implement transmit and receive functionalities using common and/or integrated transmit/receive elements.

In some demonstrative embodiments, wireless communication units 110 and/or 120 include, for example, one or more radios 114, e.g., including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication devices 102, 104, 106 and/or 108 may perform the functionality of DMG STAs, e.g., wireless communication devices 102, 104, 106 and/or 108 may be configured to communicate over the DMG band.

For example, system 100 may include a PCP/AP STA and one or more non-PCP/non-AP STAs. For example, device 102 may perform the functionality of a PCP/AP STA and/or devices 104, 106 and/or 108 may perform the functionality of a non-PCP/AP STA.

In some demonstrative embodiments, wireless communication devices 102, 104 106 and/or 108 may perform the functionality of WFA P2P devices. For example, device 102 may perform the functionality of a P2P group owner, and devices 104, 106 and/or 108 may perform the functionality of a P2P client device.

In some demonstrative embodiments, devices 102, 104, 106 and/or 108 may communicate during one or more beacon intervals (BI).

Figure 2:
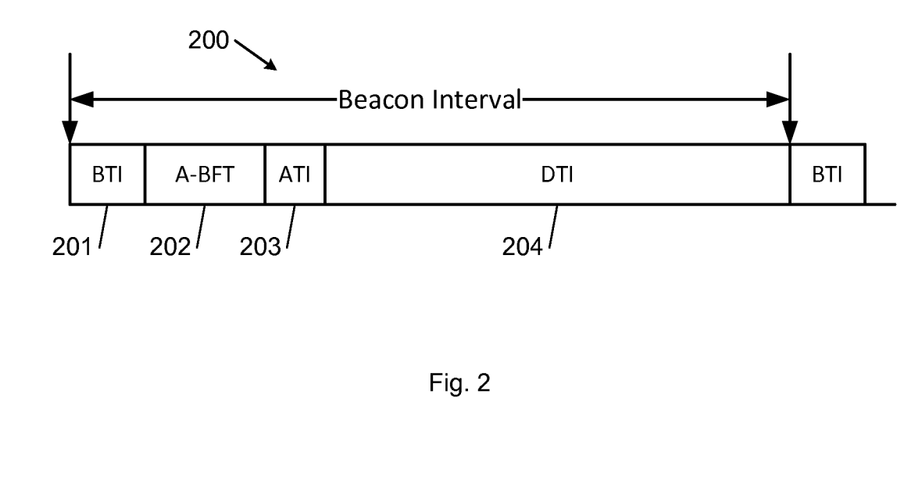
FIG. 2 is a schematic illustration of a beacon interval, in accordance with some demonstrative embodiments.

Reference in now made to FIG. 2, which schematically illustrates a beacon interval (BI) 200, in accordance with some demonstrative embodiments. For example, devices 102, 104, 106 and/or 108 (FIG. 1) may communicate during BI 200.

As shown in FIG. 2, BI 200 may include a beacon transmission interval (BTI) 201 followed by an Association-Beamforming-Training (A-BFT) 202. BI 200 may also include one or more additional periods, for example, an announcement transmission interval (ATI) 203, and/or a data transfer interval (DTI) 204.

One or more client devices, e.g., devices 104, 106 and/or 108 (FIG. 1), may perform a beamforming procedure with a PCP/AP STA device, e.g., device 102 (FIG. 1), during A-BFT 202, in order to establish a directional and/or high throughput wireless communication link to the PCP/AP STA device.

Congestion over wireless communication medium 103 (FIG. 1) during A-BFT 202 may be likely to increase, for example, if a relatively high number of client devices attempt to perform beamforming with device 102 (FIG. 1) during A-BFT 202. For example, wireless communication medium 103 (FIG. 1) may be highly congested, e.g., if devices 104, 106, 108 (FIG. 1) and/or other neighboring devices attempt to perform beamforming with device 102 (FIG. 1) during A-BFT 202.

In some demonstrative embodiments, allowing all client devices, which receive a beacon frame from device 102 (FIG. 1) during BTI 201 to communicate during A-BFT 202, may result in a relatively high level of congestion over wireless communication medium 103 (FIG. 1). For example, allowing devices 104, 106, 108 (FIG. 1) and/or other neighboring devices, which receive the beacon, to transmit during A-BFT 202, may increase congestion over wireless communication medium 103 (FIG. 1). The high congestion over wireless communication medium 103 (FIG. 1) may increase an accumulated latency of communication by the client devices and/or may increase power consumption of the client devices.

Referring back to FIG. 1, in some demonstrative embodiments, wireless communication unit 110 may allow only one or more selected client devices to transmit during A-BFT 202 (FIG. 2). In one example, wireless communication unit 110 may allow only device 104 to transmit during A-BFT 202 (FIG. 2), while devices 106 and 108 may not be allowed to transmit during A-BFT 202 (FIG. 2). In another example, wireless communication unit 110 may allow only devices 104 and 106 to transmit during A-BFT 202 (FIG. 2), while device 108 may not be allowed to transmit during A-BFT 202 (FIG. 2), e.g., as described in detail below.

In some demonstrative embodiments, wireless communication unit 110 may communicate a beacon frame during BTI 201 (FIG. 2) including a responder address field including a responder address representing one or more client devices, which are allowed to transmit during A-BFT 202 (FIG. 2) following BTI 201 (FIG. 2), e.g., as described in detail below.

Allowing only one or more, e.g., not all, of the client devices to transmit during A-BFT 202 (FIG. 2), may reduce congestion over wireless communication medium 103. As a result, accumulated latency of client devices and/or power consumption of the client devices may be reduced. For example, devices 104, 106 and/or 108 may have a relatively reduced accumulated latency and/or power consumption.

In some demonstrative embodiments, the responder address field may represent an address of an individual client device. For example, the responder address field may include an address of device 104, device 106 or device 108.

In some demonstrative embodiments, the responder address field may represent a group address of a group of client devices. For example, the responder address field may represent a group address of a group including, for example, one or more of devices 104, 106 and 108.

Figure 3:
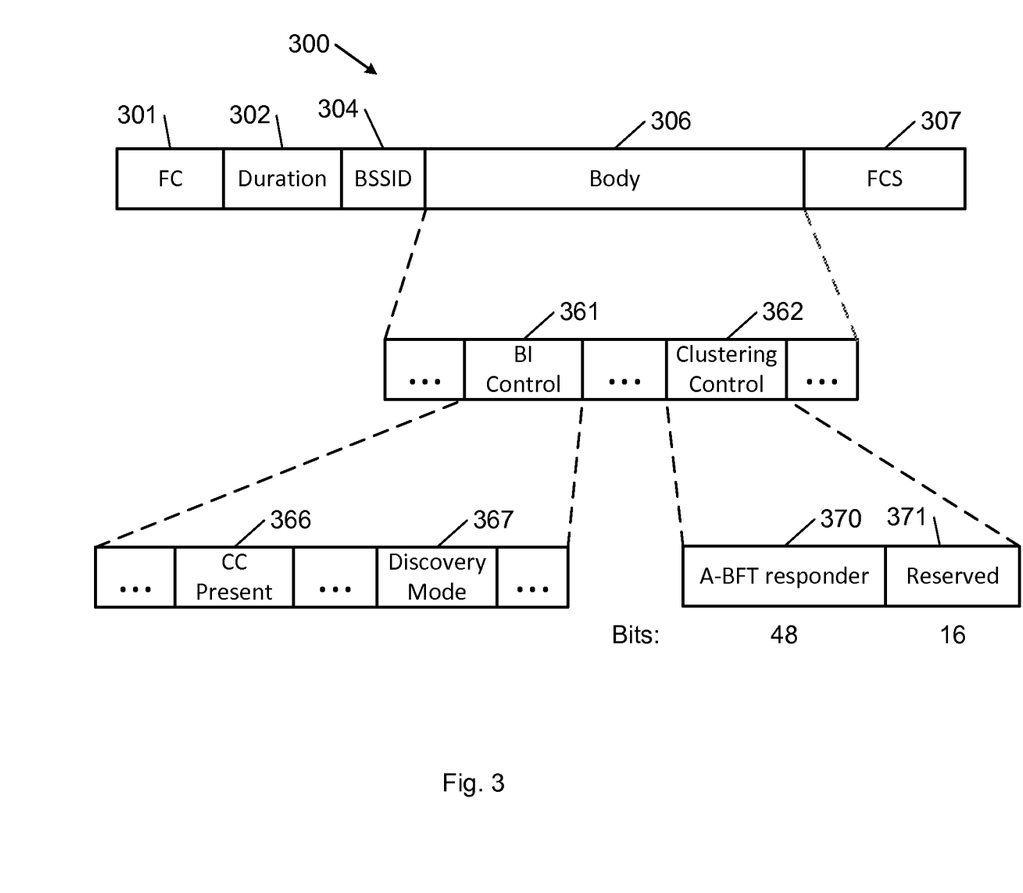
FIG. 3 is a schematic illustration of a beacon frame including a responder address field, in accordance with some demonstrative embodiments.

Reference is now made to FIG. 3, which schematically illustrates a beacon frame 300, in accordance with some demonstrative embodiments.

In some demonstrative embodiments, beacon frame 300 may be transmitted by a central device to one or more client devices during a BTI. For example, device 102 (FIG. 1) may transmit beacon frame 300 to devices 104, 106 and 108 (FIG. 1) during BTI 201 (FIG. 2).

In some demonstrative embodiments, beacon frame 300 may include a frame control field 301, a BI duration field 302, a BSS identifier (BSSID) field 304, a portion 306 ("body") and a frame check sequence (FCS) field 307.

In some demonstrative embodiments, beacon frame 300 may include an A-BFT responder address field 370, e.g., as part of body portion 306, including a responder address representing one or more client devices, which are allowed to transmit during an A-BFT period following a BTI.

In some demonstrative embodiments, A-BFT responder address field 370 may represent an address of an individual client device. For example, responder address field 370 may represent an individual address of one of devices 104, 106 and 108 (FIG. 1).

In some demonstrative embodiments, A-BFT responder address field 370 may include a Media Access Control (MAC) address of an individual client device. For example, A-BFT responder field 370 may include a MAC address of device 104, 106 or 108 (FIG. 1).

In some demonstrative embodiments, A-BFT responder address field 370 may represent a group address of a group of client devices. In one example, A-BFT responder address field 370 may represent a group address of a group of one or more of devices 104, 106 and 108 (FIG. 1). In another example, responder address field 370 may represent a group address of any other group including one or more of devices 104, 106 and 108 (FIG. 1).

As shown in FIG. 3, A-BFT responder field 370 may have a predefined size, e.g., of 48 bits, for example, to include a size of a MAC address of a client device, e.g., device 104, or a group address of a group of client devices.

In some demonstrative embodiments, A-BFT responder address field 370 may be part of an optional clustering control field 362 including A-BFT responder address field 370 and a reserved field 371.

In some demonstrative embodiments, body 306 may include a plurality of elements. For example, body 306 may include a beacon interval control field 361 and clustering control field 362.

In some demonstrative embodiments, beacon interval control field 361 may include a plurality of elements to be applied during the BI.

For example, beacon interval control field 361 may include, for example, a clustering control present (CC present) field 366 to indicate whether or not optional clustering control field 362 is present in beacon frame 300. For example, CC present field 366 may be set to a first predefined value, e.g., one, to indicate that clustering control field 362 is present in beacon frame 300; or to a second predefined value, e.g., zero, to indicate that clustering control field 362 is not present in beacon frame 300.

In some demonstrative embodiments, beacon interval control field 361 may include, for example, a discovery mode field 367 to indicate whether or not the PCP/AP STA transmitting beacon frame 300 to the client devices before establishing a wireless communication link over wireless communication medium 103 (FIG. 1). For example, discovery mode field 367 may be set to a first predefined value, e.g., one, to indicate that device 102 (FIG. 1) transmits beacon frame 300 during a BTI, e.g., BTI 201 (FIG. 2), before establishing a wireless communication link with devices 104, 106 and/or 108 (FIG. 1); or to a second predefined value, e.g., zero, to indicate that beacon frame 300 is not transmitted before establishing of the wireless communication link.

In some demonstrative embodiments, clustering control field 362 may include different elements according to the IEEE 802.11ad, WGA, and/or WFA P2P specifications, e.g., if discovery mode field 367 is set to zero and CC present field 366 is set to one.

In one example, a device, e.g., device 102 (FIG. 1) may allow one or more selected client devices to communicate during A-BFT 202 (FIG. 2) by communicating beacon frame 300 during BTI 201 (FIG. 2) having optional clustering control field 361 including responder address field 370, which includes a responder address representing the one or more selected client devices, and beacon interval control field 361 including discovery mode field 367 set to one and CC present field 366 set to one.

Referring back to FIG. 1, in some demonstrative embodiments, devices 104, 106 and/or 108 may receive the beacon frame transmitted from device 102 during BTI 201 (FIG. 2). For example, wireless communication unit 120 may receive beacon frame 300 (FIG. 3).

In some demonstrative embodiments, a client device may transmit during A-BFT period 202 (FIG. 2) if the responder address field represents an address of the client device. For example, device 104 may transmit during A-BFT period 202 (FIG. 2) if responder address field 370 (FIG. 3) represents an address of device 104. Device 106 may not transmit during A-BFT period 202 (FIG. 2) if responder address field 370 (FIG. 3) does not represent an address of device 106.

In some demonstrative embodiments, the client device may transmit during A-BFT period 202 (FIG. 2) only if the responder address field is equal to a MAC address of the client device or the responder address field represents a group address of a group including the client device.

In one example, device 104 may transmit during A-BFT 202 (FIG. 2) if responder address field 370 (FIG. 3) includes a MAC address, which is equal to the MAC address of device 104, or if responder address field 370 (FIG. 3) includes a group address of a group including device 104, e.g., a group address of a group including, for example, devices 104, 106 and/or 108.

In another example, device 108 may not transmit during A-BFT 202 (FIG. 2) period, if, for example, responder address field 370 (FIG. 3) includes a MAC address, which is not equal to the MAC address of device 108, e.g., a MAC address of device 104, or if responder address field 370 (FIG. 3) includes a group address of a group, which does not include device 108, e.g., a group address of a group including, for example, devices 104 and 106.

In some demonstrative embodiments, device 102 may receive one or more transmissions only from one or more client devices of the one or more client devices represented by the responder address field.

In some demonstrative embodiments, device 102 may receive transmissions only from an individual client device if the responder address field represents the individual client address.

For example, wireless communication unit 110 may transmit during BTI 201 (FIG. 2) beacon frame 300 (FIG. 3) including A-BFT responder address field 370 representing an individual client device. Accordingly, wireless communication unit 110 may receive transmission during A-BFT 202 (FIG. 2) only from the individual client device. For example, wireless communication unit 110 may transmit beacon frame 300 including A-BFT responder address field 370 including a MAC address of device 104. Accordingly, wireless communication unit 110 may receive transmissions during A-BFT 202 (FIG. 2) only from device 104. Wireless communication unit 110 may not receive transmissions from devices 106, 108 and/or other devices during A-BFT 202 (FIG. 2).

In some demonstrative embodiments, device 102 may receive transmissions only from a group of client devices, if the responder address field represents a group address of the group of client devices.

For example, wireless communication unit 110 may transmit during BTI 201 (FIG. 2) beacon frame 300 (FIG. 3)

including A-BFT responder address field 370 representing a group address of a group one or more devices. Accordingly, wireless communication unit 110 may receive transmissions during A-BFT 202 (FIG. 2) only from the group of one or more devices.

In one example, wireless communication unit 110 may receive transmissions during A-BFT 202 (FIG. 2) only from one or more devices of a group of devices 104, 106 and 108, e.g., if A-BFT responder address field 370 (FIG. 3) includes a group address of the group of devices 104, 106 and 108. In another example, wireless communication unit 110 may receive transmissions during A-BFT 202 (FIG. 2) only from one or more devices of a group of devices 104 and 108, e.g., if A-BFT responder address field 370 (FIG. 3) includes a group address of the group of devices 104 and 108. In yet another example, wireless communication unit 110 may not receive transmissions during A-BFT 202 (FIG. 2) from device 108, e.g., if A-BFT responder address field 370 (FIG. 3) includes a group address of a group including only devices 104 and 106.

In some demonstrative embodiments, device 102 may receive the one or more transmissions, e.g., if BTI 201 (FIG. 2) and A-BFT 202 (FIG. 2) are within a common DMG beacon interval. For example, device 102 may receive the one or more transmissions during A-BFT 202 (FIG. 2), e.g. only if A-BFT 202 follows BTI 201 (FIG. 2) within BI 200 (FIG. 2), e.g., not during another A-BFT in a next BI.

Figure 4:
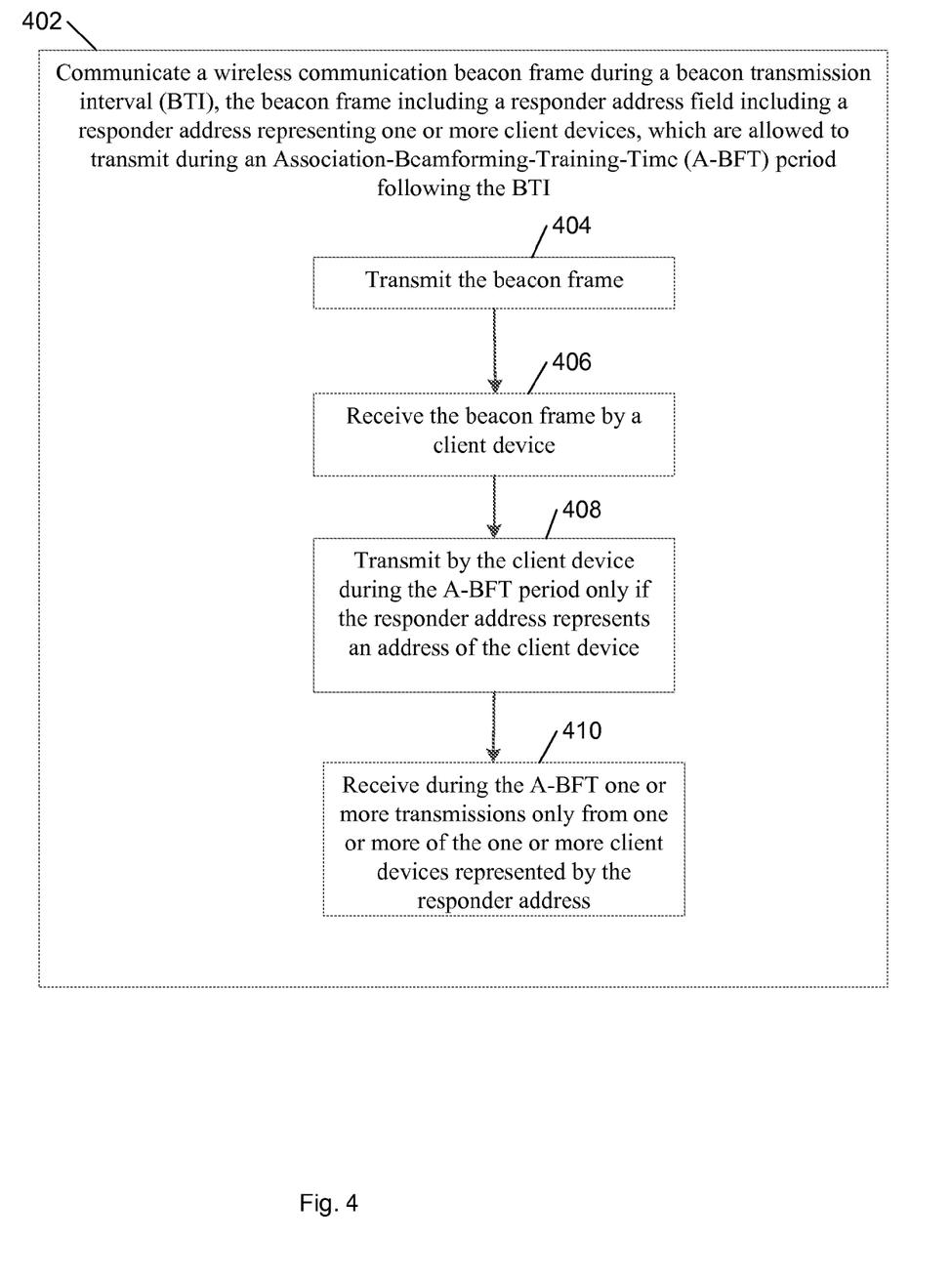
FIG. 4 is a schematic flow-chart illustration of a method of communicating during an association beamforming training (A-BFT) period, in accordance with some demonstrative embodiments.

Reference is made to FIG. 4, which schematically illustrates a method of communicating during an A-BFT, in accordance with some demonstrative embodiments. In some embodiments, one or more of the operations of the method of FIG. 4 may be performed by a wireless communication system e.g., system 100 (FIG. 1); a wireless communication device, e.g., devices 102, 104, 106 and/or 108 (FIG. 1); and/or a wireless communication unit, e.g., wireless communication units 110 and/or 120 (FIG. 1).

As indicated at block 402, the method may include communicating a wireless communication beacon frame during a beacon transmission interval (BTI), the beacon frame including a responder address field including a responder address representing one or more client devices, which are allowed to transmit during an A-BFT period following the BTI. For example, device 102 (FIG. 1) may communicate beacon frame 300 (FIG. 3) during BTI 201 (FIG. 2) including responder address field 370 (FIG. 3) including a responder address representing one or more client devices, which are allowed to transmit during A-BFT period 202 (FIG. 2) following BTI 201 (FIG. 2), e.g., as described above.

As indicated at block 404, communicating the beacon frame may include transmitting the beacon frame. For example, device 102 (FIG. 1) may transmit beacon frame 300 (FIG. 3), e.g., as described above.

As indicated at block 406, communicating the beacon frame may include receiving the beacon frame by a client device. For example, device 104 (FIG. 1) may receive beacon frame 300 (FIG. 3), e.g., as described above.

As indicated at block 408, the method may include transmitting by the client device during the A-BFT period only if the responder address represents an address of the client device. For example, device 104 (FIG. 1) may transmit during A-BFT 202 (FIG. 2) period only if responder address field 370 (FIG. 3) represents an address of device 104 (FIG. 1), e.g., as described above.

As indicated at block 410, the method may include receiving during the A-BFT one or more transmissions only from one or more of the one or more client devices represented by the responder address. For example, device 102 (FIG. 1) may receive during A-BFT 202 (FIG. 2) one or more transmissions only from one or more of the one or more client devices represented in responder address field 370 (FIG. 3), e.g., as described above.

Figure 5:
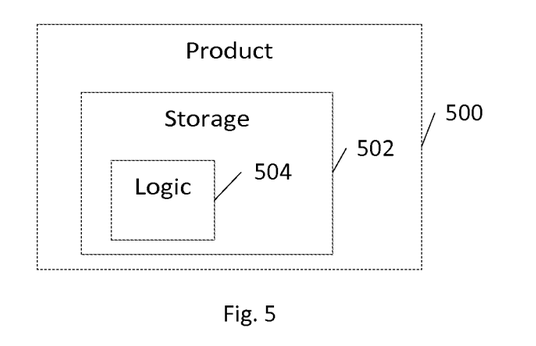
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1), device 106 (FIG. 1), device 108 (FIG. 1), wireless communication unit 110 (FIG. 1), wireless communication unit 120 (FIG. 1) and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising a transmitter and a receiver, the apparatus configured to cause a directional multi-gigabit (DMG) station to:
   receive a DMG beacon frame in a beacon transmission interval (BTI) within a beacon interval, the DMG beacon frame including a Basic Service Set Identifier (BSSID) and a clustering control field including an Association-Beamforming-Training (A-BFT) responder address subfield, the A-BFT responder address subfield including an address to indicate at least one station (STA), which is allowed to transmit during an A-BFT period following said BTI within said beacon interval; and
   transmit in said A-BFT period, if a Media-Access-Control (MAC) address of said DMG station is equal to the address in the A-BFT responder address subfield, or if the address in the A-BFT responder address subfield includes a group address of a group to which said DMG station belongs.

2. The apparatus of claim 1 to cause the DMG station to transmit in said A-BFT period, only if at least one of the following conditions are met:
   the MAC address of said DMG station is equal to the address in the A-BFT responder address subfield;
   the address in the A-BFT responder address subfield includes the group address of the group to which said DMG station belongs.

3. The apparatus of claim 1, wherein said A-BFT responder address subfield is 48 bits long.

4. The apparatus of claim 1, wherein said A-BFT period is between said BTI and an announcement transmission interval (ATI).

5. The apparatus of claim 1, wherein the A-BFT responder address subfield includes an address selected from a group consisting of an address of an individual station, and a group address of a group of stations.

6. The apparatus of claim 1 including at least one antenna.

7. An apparatus comprising a transmitter and a receiver, the apparatus configured to cause a directional multi-gigabit (DMG) station to:
   generate a DMG beacon frame including a Basic Service Set Identifier (BSSID) and a clustering control field including an Association-Beamforming-Training (A-BFT) responder address subfield, the A-BFT responder address subfield to indicate a station (STA), which is allowed to transmit during an A-BFT period following a beacon transmission interval (BTI) in a beacon interval; and
   transmit the DMG beacon frame in the BTI.

8. The apparatus of claim 7, wherein said A-BFT responder address subfield is 48 bits long.

9. The apparatus of claim 7, wherein said A-BFT period is between said BTI and an announcement transmission interval (ATI).

10. The apparatus of claim 7, wherein the A-BFT responder address subfield includes an address selected from a group consisting of an address of an individual station, and a group address of a group of stations.

11. The apparatus of claim 7 to cause said DMG station to receive a transmission from said STA during the A-BFT period.

12. The apparatus of claim 7, wherein the DMG station is a personal basic service set control point (PCP) or access point (AP) station.

13. The apparatus of claim 7 including at least one antenna.

14. A product including a non-transitory storage medium having stored thereon instructions that, when executed by one or more processors, result in a method including:
   receiving at a directional multi-gigabit (DMG) station a DMG beacon frame in a beacon transmission interval (BTI) within a beacon interval, the DMG beacon frame including a Basic Service Set Identifier (BSSID) and a clustering control field including an Association-Beamforming-Training (A-BFT) responder address subfield, the A-BFT responder address subfield including an address to indicate at least one station (STA), which is allowed to transmit during an A-BFT period following said BTI within said beacon interval; and
   transmitting in said A-BFT period, if a Media-Access-Control (MAC) address of said DMG station is equal to the address in the A-BFT responder address subfield, or if the address in the A-BFT responder address subfield includes a group address of a group to which said DMG station belongs.

15. The product of claim 14, wherein the method comprises transmitting in said A-BFT period, only if at least one of the following conditions are met:
   the MAC address of said DMG station is equal to the address in the A-BFT responder address subfield;
   the address in the A-BFT responder address subfield includes the group address of the group to which said DMG station belongs.

16. The product of claim 14, wherein said A-BFT responder address subfield is 48 bits long.

17. The product of claim 14, wherein said A-BFT period is between said BTI and an announcement transmission interval (ATI).

18. The product of claim 14, wherein the A-BFT responder address subfield includes an address selected from a group consisting of an address of an individual station, and a group address of a group of stations.

19. A product including a non-transitory storage medium having stored thereon instructions that, when executed by one or more processors, result in a method including:
   generating a directional multi-gigabit (DMG) beacon frame including a Basic Service Set Identifier (BSSID) and a clustering control field including an Association-Beamforming-Training (A-BFT) responder address subfield, the A-BFT responder address subfield to indicate a station (STA), which is allowed to transmit during an A-BFT period following a beacon transmission interval (BTI) in a beacon interval; and
   transmitting the DMG beacon frame in the BTI.

20. The product of claim 19, wherein said A-BFT responder address subfield is 48 bits long.

21. The product of claim 19, wherein said A-BFT period is between said BTI and an announcement transmission interval (ATI).

22. The product of claim 19, wherein the A-BFT responder address subfield includes an address selected from a group consisting of an address of an individual station, and a group address of a group of stations.

23. The product of claim 19, wherein the method comprises receiving a transmission from said STA during the A-BFT period.

24. The product of claim 19, wherein the method comprises transmitting the DMG beacon from a personal basic service set control point (PCP) or access point (AP) station.

* * * * *